US010673809B2

(12) United States Patent
Fontaine et al.

(10) Patent No.: US 10,673,809 B2
(45) Date of Patent: Jun. 2, 2020

(54) TECHNIQUE FOR MANAGING AN ADDRESS IN A LOCAL AREA NETWORK

(71) Applicant: ORANGE, Paris (FR)

(72) Inventors: Fabrice Fontaine, Geveze (FR); Nicolas Neyret, Lannion (FR)

(73) Assignee: ORANGE, Paris (FR)

( * ) Notice: Subject to any disclaimer, the term of this patent is extended or adjusted under 35 U.S.C. 154(b) by 72 days.

(21) Appl. No.: 15/764,117

(22) PCT Filed: Sep. 23, 2016

(86) PCT No.: PCT/FR2016/052420
§ 371 (c)(1),
(2) Date: Mar. 28, 2018

(87) PCT Pub. No.: WO2017/055718
PCT Pub. Date: Apr. 6, 2017

(65) Prior Publication Data
US 2018/0287995 A1    Oct. 4, 2018

(30) Foreign Application Priority Data

Sep. 29, 2015    (FR) ...................................... 15 59175

(51) Int. Cl.
*G06F 15/16*    (2006.01)
*H04L 29/12*    (2006.01)
(Continued)

(52) U.S. Cl.
CPC ........ *H04L 61/2053* (2013.01); *H04L 61/103* (2013.01); *H04L 61/2015* (2013.01); *H04L 63/108* (2013.01); *H04W 12/08* (2013.01)

(58) Field of Classification Search
CPC .............. H04L 61/103; H04L 61/2015; H04L 61/2053; H04L 63/108
(Continued)

(56) References Cited

U.S. PATENT DOCUMENTS

2006/0209768 A1 *    9/2006  Yan .................... H04L 29/12311
370/338
2007/0203990 A1 *    8/2007  Townsley .............. H04L 9/3271
709/206

(Continued)

OTHER PUBLICATIONS

R. Droms, "Dynamic Host Configuration Protocol", RFC 2131, Mar. 1997.
(Continued)

*Primary Examiner* — Karen C Tang
(74) *Attorney, Agent, or Firm* — David D. Brush; Westman, Champlin & Koehler, P.A.

(57) ABSTRACT

A method for managing an address in a local area network using an access device allowing access to an extended communication network. The address allows a device of the local area network to communicate with other devices by using the access device. The access device obtains an access control rule to be applied for blocking communication of data packets from at least one start time and until an end time. The access device then sends, to a device of the local area network, a message relating to an address in the local area network associated with the device. The message indicates that the address is no longer valid from the start time. The access device implements at least one action leading to an absence of a valid address for the device of the local area network, as long as the end time of the access control rule is not exceeded.

11 Claims, 3 Drawing Sheets

(51) Int. Cl.
*H04L 29/06* (2006.01)
*H04W 12/08* (2009.01)

(58) Field of Classification Search
USPC .................................................. 709/231, 224
See application file for complete search history.

(56) References Cited

U.S. PATENT DOCUMENTS

| | | | |
|---|---|---|---|
| 2007/0203999 A1* | 8/2007 | Townsley | H04L 29/1282 709/207 |
| 2009/0103550 A1* | 4/2009 | Miyata | H04L 12/427 370/400 |
| 2009/0157889 A1* | 6/2009 | Treuhaft | H04L 29/12066 709/230 |
| 2011/0106947 A1* | 5/2011 | Lin | H04L 29/12216 709/225 |
| 2011/0113130 A1 | 5/2011 | Harris | |
| 2012/0026933 A1* | 2/2012 | Aso | H04L 12/5692 370/315 |
| 2013/0083782 A1* | 4/2013 | Murphy | H04L 61/103 370/338 |
| 2013/0238769 A1* | 9/2013 | Asati | H04L 61/103 709/220 |
| 2013/0308546 A1* | 11/2013 | Naraha | H04W 48/08 370/328 |
| 2013/0332586 A1* | 12/2013 | Masputra | H04L 69/167 709/220 |
| 2014/0098812 A1* | 4/2014 | Korhonen | H04L 61/2053 370/389 |
| 2014/0167979 A1* | 6/2014 | Soma | H04O 9/00 340/870.02 |
| 2016/0028554 A1* | 1/2016 | Lea | H04L 12/189 370/312 |
| 2016/0146742 A1* | 5/2016 | Chang | G01N 22/00 324/633 |
| 2017/0063929 A1* | 3/2017 | Burbridge | H04L 61/1511 |

OTHER PUBLICATIONS

R. Droms, et al., "Dynamic Host Configuration Protocol for IPv6 (DHCPv6)", RFC 3315, Jul. 2003.
S. Thomson et al., "IPv6 Stateless Address Autoconfiguration", RFC 4862, Sep. 2007.
International Search Report dated Dec. 14, 2016 for corresponding International Application No. PCT/FR2016/052420, filed Sep. 23, 2016.
Written Opinion of the International Searching Authority dated Dec. 14, 2016 for corresponding International Application No. PCT/FR2016/052420, filed Sep. 23, 2016.

* cited by examiner

TECHNIQUE FOR MANAGING AN ADDRESS IN A LOCAL AREA NETWORK

CROSS-REFERENCE TO RELATED APPLICATIONS

This Application is a Section 371 National Stage Application of International Application No. PCT/FR2016/052420, filed Sep. 23, 2016, the content of which is incorporated herein by reference in its entirety, and published as WO 2017/055718 on Apr. 6, 2017, not in English.

FIELD OF THE DISCLOSURE

The invention relates to the general field of telecommunications.

The invention relates more particularly to a technique for managing an address in a local area network by means of an access device.

The access device enables, notably, devices located at a client site or local area network to access a wide area communication network (abbreviated to WAN, for "Wide Area Network") such as the Internet. For a local area network, the access device is known as an access gateway.

BACKGROUND OF THE DISCLOSURE

Parental control may be implemented at an access gateway to limit the access of certain devices of the local area network to the Internet and to the local area network. This parental control allows a main user to define authorized or prohibited time ranges for a device in the local area network. By way of example, a child is given authorized access from 17.00 to 18.30 every day, his access being blocked outside this time range.

The access gateway must then inspect all the packets that it receives from devices of the local area network, to detect whether or not this access is authorized. This results in a significant processing load at the access gateway, notably in its processor.

SUMMARY

One of the objects of the invention is to overcome some deficiencies/drawbacks of the prior art and/or to make improvements thereto.

According to a first aspect, the invention proposes a method for managing an address in a local area network by means of an access device allowing access to a wide area communication network, an address allowing a device in the local area network to communicate via the access device with other devices. This method comprises:
  the obtaining by the access device of an access control rule to be applied, said rule being intended to block communication of data packets from at least one start time;
  the sending by the access device to at least one device in the local area network of a message relating to an address in the local area network associated with said device, said message carrying an item of information indicating to the device that said address is no longer valid from said start time.

The access device also executes at least one action leading to an absence of a valid address for this device of the local area network, as long as the end time of the access control rule has not passed.

The management method originates from a problem identified in the implementation of parental control. It is emphasized here that it may also be executed as soon as an access device has to apply a control rule to packets that have been sent or are intended for devices of a local area network. The local area network may equally well be either a home network in which a parental control rule is to be applied or a business network in which an access control rule is to be applied.

Because of a message transmitted by the access device to a device in the local area network, an address in the network allocated to the device in the local area network becomes invalid, at least at the start time of the control rule that is to be applied. This has the effect of preventing the device from communicating with other devices which may be located either in the local area network or in the wide area communication network. The control of the traffic by the access device is then operational. Thus this technique makes it possible to avoid inspecting all the packets for the purpose of applying the control rule. The processing load on the access device for implementing the control rule is not increased. Furthermore, the address management protocol requires no modification. The address management technique may thus be advantageously applied to the implementation of parental control in a home network.

It is emphasized here that a solution for reducing the processing load could be to inspect only the packets corresponding to the establishment of a new connection. In this case, only the first packets of a connection are inspected, and the following packets received from the Internet are directly transmitted over the local area network toward their recipient. Thus, for the example of parental control described above, if a child tries to establish a connection at 16.30, this request is blocked. However, if the child tries to establish a connection at 17.30, this request is authorized. This solution has the drawback of not cutting the connections that have already been established at the start time of the controlled time range. Thus, a connection established before the start time of the parental control rule, that is to say 18.30, continues to be established until it is terminated by an action of a remote server or of the child.

The technique of address management in the local area network makes it possible to cut this connection that has been established before the access control start time. The processing load at the access device is also reduced by comparison with this solution, because there is no need to inspect the packets corresponding to the establishment of a new connection. The access device then ensures that the device in the local area network does not have a valid address for as long as the access control rule is to be applied.

The address in the network that is allocated may be either an IPv4 address or an IPv6 address.

The different forms or characteristics of embodiment mentioned below may be added, independently or in combination with one another, to the steps of the management method as defined above.

In a particular embodiment, the message that is sent allocates an address to the device for an allocation period which is determined on the basis of the start time.

The address is then allocated with an allocation period which depends on the start time of the access control rule. The allocation period may be sent in an explicit manner or may be sent in an implicit manner and deduced from the lease period. This determination makes it possible to ensure that the address in the network will no longer be valid at the start time. When the allocation period has elapsed, the device in the local area network must then request a renewal of its address. This is because it no longer has a valid address in the network, and cannot access either the local area network or the wide area communication network.

The message that is sent is a message of the protocol known as the DHCP, for "Dynamic Host Configuration Protocol". In a first variant in which the protocol is DHCPv4, the message sent in response to a request DHCP Request is a message DHCP ACK, comprising a lease. In a second variant in which the protocol is "stateful" DHCPv6 (as it is known in English), the message sent in response to a request DHCP Request is a message DHCPv6 Reply, comprising a lifetime.

According to a particular characteristic, an address allocation refusal is sent by the access device in response to a request from the device in the local area network received after the start time. Such an address allocation refusal is an example of an action leading to an absence of a valid address.

This makes it possible to avoid delaying subsequent address allocation requests.

According to a particular embodiment, the message is sent from the start time onward, and is a message broadcasting a prefix indicating a zero lifetime, said prefix being intended to allow the device in the local area network to construct said address.

The message sent is a message of the ICMPv6, for "Internet Control Management Protocol"; more precisely, it is an ICMPv6 Router Advertisement message. This message is sent to the device in the local area network as soon as the access control start time is reached. This embodiment corresponds to an implementation of what is known in English as "stateless" autoconfiguration in an IPv6 type network. Such a transmission is renewed for as long as the access control rule is to be applied.

In a particular embodiment, a new address is sent by the access device in response to a request from the device received after the start time, the access control rule being applied by the access device for data packets whose source address corresponds to the new address sent. Such a transmission of a new address is an example of an action leading to an absence of a valid address.

This makes it possible to avoid repeated requests for address allocation from the device in the local area network no longer having a valid address.

In a particular embodiment, the management method further comprises a modification by the access device of a set of addresses to which said address belongs.

This makes it possible to prevent the device in the local area network from configuring a static address in the set of addresses used by the access device. As soon as a new set is activated, the static address belonging to the former set of addresses ceases to be valid.

According to a second aspect, the invention also concerns an access device allowing access to a wide area communication network. This device comprises:

an access control module, arranged to obtain an access control rule to be applied, said rule being intended to block communication of data packets from at least one start time onward;

an address control module, arranged to send to at least one device in the local area network a message relating to an address in the local area network associated with said device, an address allowing said device in the local area network to communicate via the access device with other devices, said message carrying an item of information indicating to the device that said address is no longer valid from said start time.

The address control module is also arranged to execute at least one action leading to an absence of a valid address for said device in the local area network until the end time of the access control rule has passed.

The advantages mentioned for the management method according to the first aspect are directly transferable to the access device.

In a particular embodiment, the address control module is also arranged to allocate an address to the device for an allocation period which is determined on the basis of the start time.

In a particular embodiment, the address control module also being arranged to broadcast a prefix, said prefix being intended to allow the device in the local area network to construct said address, the message sent from the start time onward is a message for broadcasting a prefix indicating a zero lifetime.

According to a third aspect, the invention concerns a program for an access device, comprising program code instructions intended to command the execution of those of the steps of the management method described above that are executed by the access device, when this program is executed by this device, and a recording medium readable by an access device, on which a program for a device is recorded.

The advantages mentioned for the management method according to the first aspect are directly transferable to the program for an access device and to the recording medium.

BRIEF DESCRIPTION OF THE DRAWINGS

The invention will be more clearly understood with the aid of the following description of specific embodiments of the management method, with reference to the attached drawings, in which.

DETAILED DESCRIPTION OF ILLUSTRATIVE EMBODIMENTS

Figure 1:
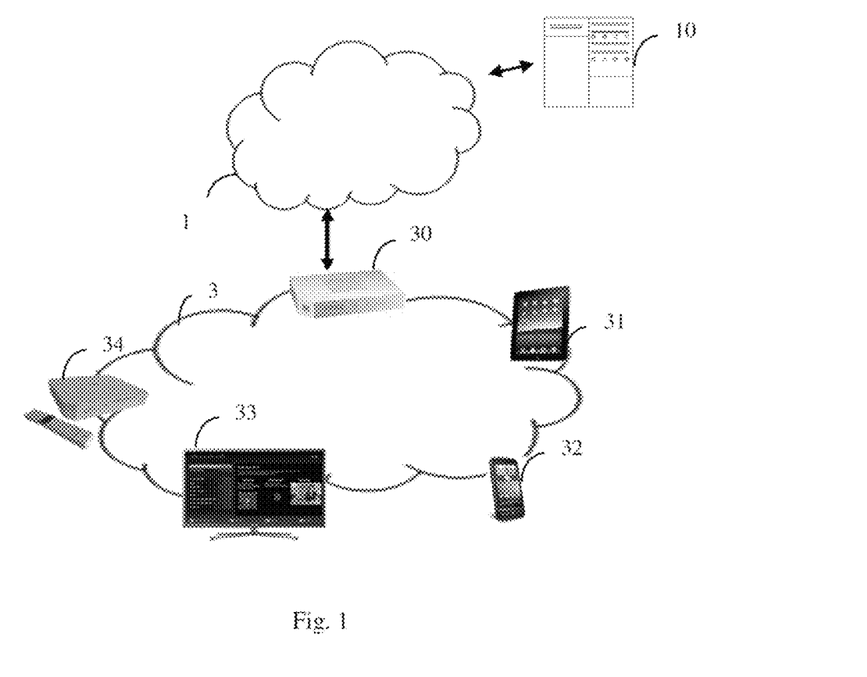
FIG. 1 shows a local area network in which the management method is executed according to a particular embodiment.

FIG. 1 shows a private or local communication network 3. The IP (for "Internet Protocol") protocol is used by the devices in the local area network to communicate with one another and also to communicate with other devices via a wide area communication network or "WAN" (for "Wide Area Network") 1, such as the Internet.

For the environment shown in FIG. 1, the expression "local communication network" 3 is taken to mean a network of the LAN ("Local Area Network") type. This network may be, in particular, a home network or a business network. An access device 30 is arranged to provide devices of the local area network 3 with access to the wide area communication network (for example the Internet) via an access network, not shown in FIG. 1. The access device 30 routes data packets between the wide area communication network 1 and the local area network 3. This device is, for example, a home gateway or a business gateway, or alternatively a router. The access network is, for example, an access network known as an xDSL (for "Digital Subscriber Line", where x indicates that it may be an ADSL, HSDL, VDSL, or other network). It may also be an FTTH (for "Fiber To The Home") network or a mobile network such as a 3G or 4G network. No limitations are placed on the type of access network.

The devices 31-34 of the local area network 3 may be any devices, for example domestic appliances, having a wired or wireless network connection. By way of illustrative examples, various devices are shown in FIG. 1. The devices may be, for example, a computer, a tablet 31, a mobile terminal 32, a television 33, a TV decoder 34 (or "Set-Top Box"), a games console, electrical domestic appliances, or the like. No limitations are placed on the number or types of these devices. By way of illustrative example, these various devices exchange data in the local area network via radio communication channels, using, notably, the wireless transmission technology based on the IEEE 802.11 radio network standard and later versions thereof, commonly grouped together under the name Wi-Fi (for "Wireless Fidelity").

The access device 30 has an IP address allowing it to communicate with other devices 10 of the wide area communication network 1.

The local area network 3 may be an IPv4 or IPv6 type network. If the local area network 3 is of the IPv4 type, an address is associated with each device 31-34 to allow it to communicate with other devices. This address is called a private address. A packet according to the Internet protocol, called an IP packet, sent by the device comprises this private IP address as the source address of the packet. An IP packet received by the device comprises this private IP address as the destination address of the packet. The DHCPv4 protocol (where DHCP stands for "Dynamic Host Configuration Protocol") defined in the IETF RFC 2131 document is used for allocating the addresses in the local area network.

If the local area network is of the IPv6 type, the device in the local area network autoconfigures an IP address based on routing information received from a router device according to the discovery procedure of the ICMPv6 (for "Internet Control Management Protocol"). Autoconfiguration may be carried out in a stateless or stateful way. Stateless autoconfiguration, defined in the IETF RFC 4862 document, is used when the administrative management of the assigned addresses is not required within a site. Stateful autoconfiguration is used if a site requests strict control of the assignment of addresses. In a header of the ICMPv6 "Router Advertisement" advertisement message, the access device 30 supplies the type of autoconfiguration to be used, and, if appropriate, supplies the information required for its configuration. The M bit (for "Managed address configuration") may be used to supply the information about the type of autoconfiguration:

if it is set to the value "0", it indicates that the device must construct the address itself, on the basis of its interface identifier and the prefixes received (stateless autoconfiguration);

if it is set to the value "1", it indicates that the device must expressly request its address from an address server (stateful autoconfiguration). The stateful autoconfiguration mechanism is based on the client-server model and makes use of the DHCPv6 protocol, defined in the IETF RFC 3315 document.

On the other hand, a MAC (for "Media Access Control") address is a physical identifier stored in a network card or a network interface. This MAC address is unique. It may be used to identify a device in the local area network.

A user may configure the access control implemented by the access device 30 by means of a human-machine interface. In a home network, for this configuration, the user may execute an application on the tablet 31 or the mobile terminal 32. This application may be used, notably, to define parental control rules, that is to say to authorize or prohibit a user's access on the basis of defined time ranges. A prohibition time range comprises a control start time and a control end time. The prohibition may also be global, in which case it applies to all users. The user is, for example, identified by the MAC address of the device that he is using.

An access device 30 for accessing a wide area communication network will now be described with reference to FIG. 3, in a particular embodiment. Such a device comprises, notably:

a storage area 301, arranged to store a program that comprises code instructions for executing the steps of the management method;

a storage memory (not shown), arranged to store data used in the execution of the management method:

a processor 300 for executing code instructions of software modules;

a first communication module 302, arranged to communicate with the wide area communication network;

a second communication module 303, arranged to communicate with the devices of the local area network 3;

an access control module 304, arranged to execute an access control application, for defining access control rules and applying them;

an address control module 305;

a packet routing module 306, arranged to route packets received from the wide area communication network or from devices in the local area network toward devices in the local area network, and to route packets received from the local area network toward recipient devices in the local area network or via the wide area communication network.

Figure 3:
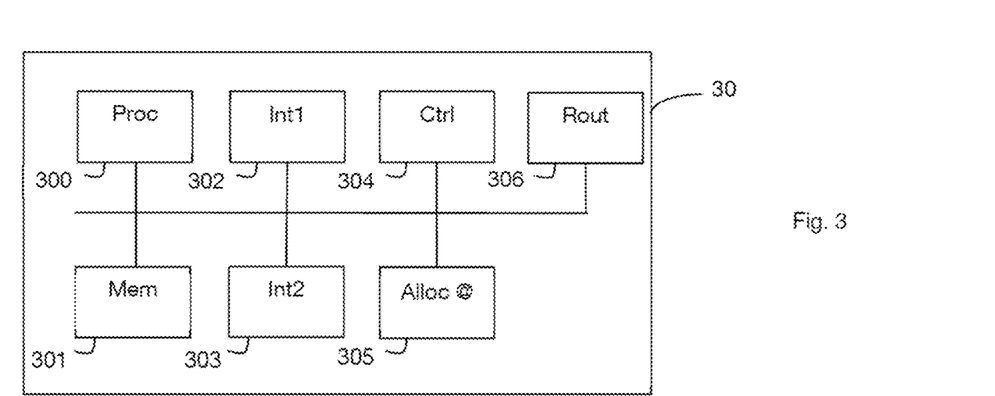
FIG. 3 shows an access device according to a particular embodiment.

It is emphasized here that the access device 30 also comprises other processing modules, not shown in FIG. 3, arranged to execute the various functions of an access device.

The first interface module 302 is, for example, an xDSL, FTTH, 3G or 4G module.

The second interface module 303 is, for example, a module for accessing a wireless network, such as the Wi-Fi.

The technique for managing an address in a local area network will now be described in particular embodiments with reference to FIGS. 2a-2c.

This management technique is based on a transmission by the access device 30, to at least one device of the local area network 31-34, of a message relating to an address in the local area network associated with this device. This message carries an item of information indicating to the device that the address associated with it is no longer valid from a given time. This time is a start time of an access control rule to be applied. This rule is intended to block the communication of data packets from and to at least one device of the local area network, starting from at least one start time. As long as the access control rule is applicable, that is to say as long as the end time of the access control rule has not passed, the access device 30 executes one or more actions leading to an absence of a valid address for the device in the local area network.

The various embodiments are described below in the context of a parental control application.

Figure 2A:
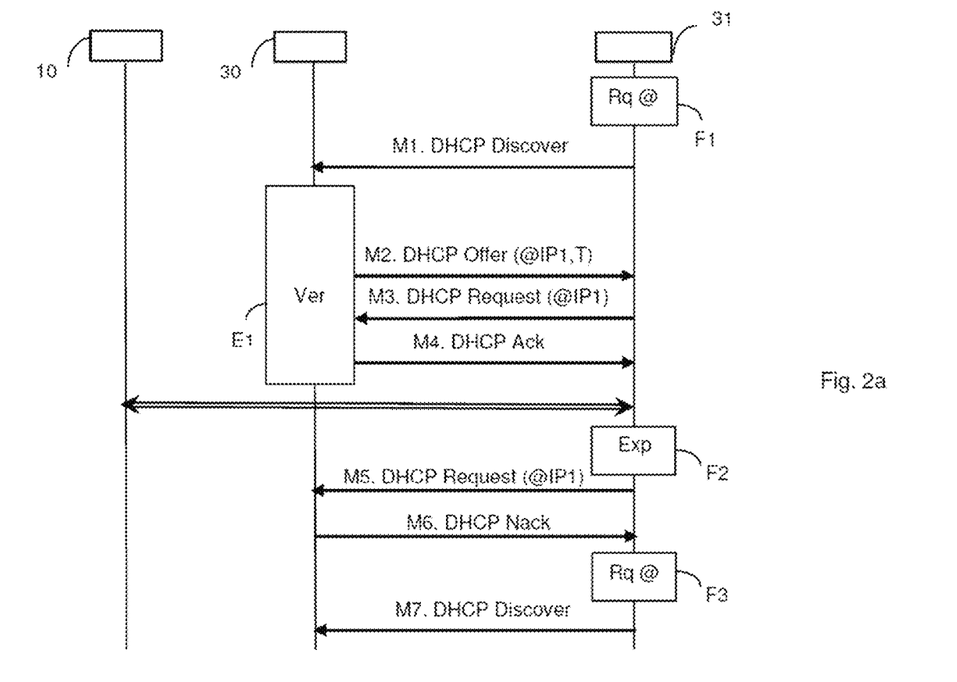
FIGS. 2a-2c show steps of a management method according to particular embodiments.
Figure 2B:
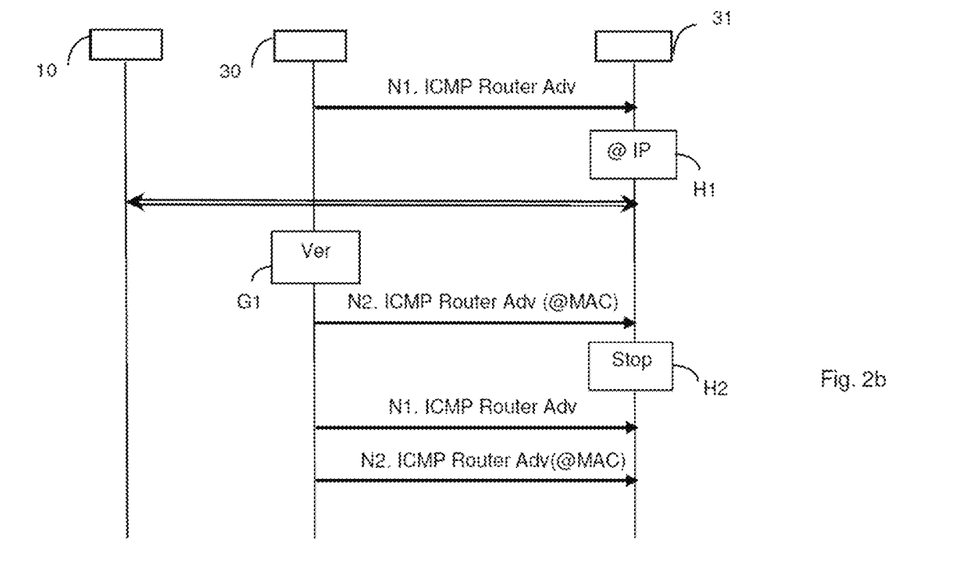
Figure 2C:
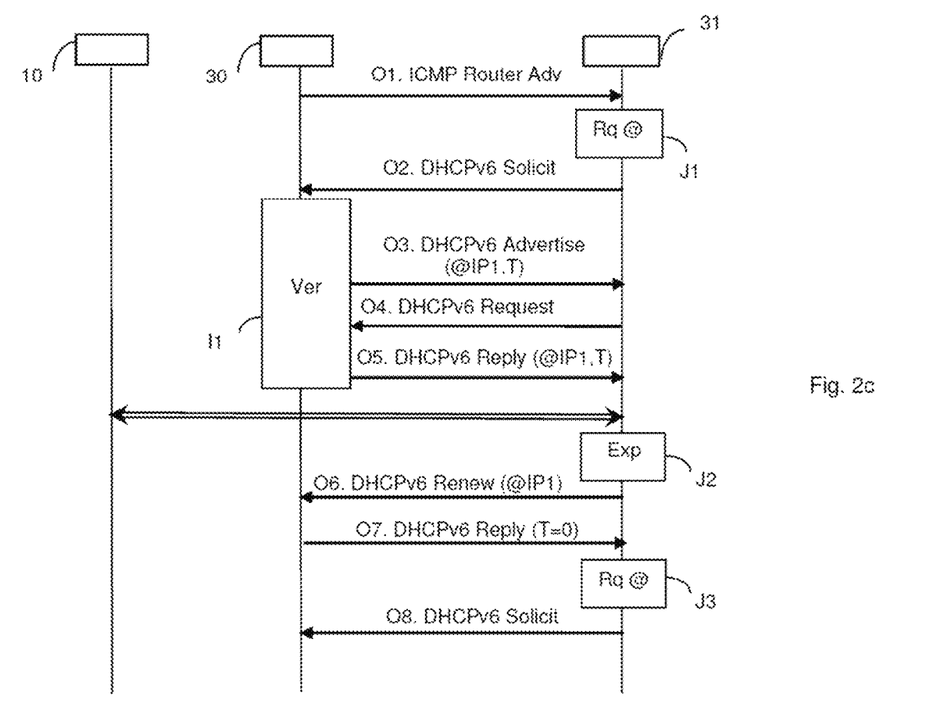

In these various embodiments, in a step E0, not shown in FIGS. 2a-2c, the parental control module 304 obtains a parental control rule to be applied to a given device in the local area network, or to a group of devices, or alternatively to all the devices. A device in the local area network is, notably, identified by means of its MAC address. The parental control rule is, for example, obtained via a human-machine interface of the access device, or via an administrator device of the local area network 3.

FIG. 2a describes more precisely the exchanges between the access device 30 and a device in the local area network 31 in a first particular embodiment. This first mode corresponds to a local area network of the IPv4 type.

The address control module 305 is, notably, arranged to allocate addresses in the local area network, and implements the DHCPv4 protocol.

Positioning ourselves at the device 31 in the local area network, we shall assume that no IP address is associated with it on initialization.

In a step F1, the device 31 in the local area network 3 initiates an address allocation procedure. More precisely, the device 31 sends, in what is known in English as "broadcast" mode, a request M1 to discover a DHCP server. This request M1 is a DHCP Discover message broadcast to a recipient port having the value 67. It comprises, among other pieces of information, an identifier of the transmitting device in the form of its MAC address.

This message M1 is received by the address control module 305 of the access device 30 in a step E1. This is because, according to the standard, the access device 30 is listening for messages sent to port 67.

Also in this step E1, the address control module 305 verifies whether there is a parental control rule to be applied to the device identified in the message M1. We then consider the case in which this verification is positive. Indeed, in the contrary case, the address allocation procedure continues according to the DHCPv4 standard with a normal lease period Tnorm, set at 24 hours for example.

It should be noted here that, according to the DHCPv4 standard, a device receiving a lease period T determines two associated timeouts:

T1 ("IP Address Renewal Time"), which is the maximum period after which the device will attempt to renew its lease with the access device that allocated an address to it. T1 is usually configured to be 50% of the lease period T. This timeout T1 is an allocation period associated with the allocated address.

T2 ("IP Address Rebinding Time"), which is the maximum period after which the device will attempt to renew its lease with any server. T2 is usually configured to be 87.5% of the lease period T.

If the verification is positive, the address control module 305 obtains a data element indicating whether or not access is authorized. The exchange of messages when access is not authorized is described subsequently with reference to a step F2 executed by the device 31. When access is authorized, the address control module 305 obtains an authorized access period, which is the difference between the start time of the control rule to be applied and the current time (that is to say, the time of receipt of the request). Depending on the implementation, this authorized access period may be determined by the address control module 305 or by the parental control module 304 on the basis of the start time of the parental control rule to be applied.

If the authorized access period is greater than the period T1norm determined for the normal lease period Tnorm, the address allocation procedure continues according to the DHCPv4 standard with the normal lease period Tnorm.

In the contrary case, that is to say if the authorized access period is shorter than the period T1norm, the address control module 305 determines, on the basis of this authorized access period, a lease period T ("IP address Lease Time") associated with an address @IP1 which will be allocated to the device in the local area network. If the conventional parameter setting of a DHCP server is applied, the lease period T is shorter than or equal to twice the authorized access period, to ensure that the period T1 expires before the start time of the parental control rule.

The address allocation procedure then continues according to the DHCPv4 standard.

Also in this step E1, the address control module 305 sends to port 68 an address offer message M2 to the device 31 identified by its MAC address. This message M2 is a DHCP Offer message, and comprises, notably, the IP address of the access device 30, the offered IP address and the determined lease period.

This message M2 is received by the device 31, which sends to the access device 30 a message M3 requesting the allocation of this address @IP1. This message M3 is a DHCP Request message, and comprises the requested IP address.

The address control module 305 then sends an acknowledgement of receipt message M4 which, notably, allocates the IP address @IP1 to the device 31. This message M4 is a DHCP Ack message, and comprises, notably, the IP address and the lease period of this address. This message M4 relating to an address in the local area network associated with the device 31 thus carries an item of information indicating to the device 31 that this address is no longer valid from the start time of the parental control rule to be applied.

The device 31 initializes the timeouts T1 and T2 on the basis of the received lease period T. The device 31 then communicates, for example, with the device 10 via the access device 30. The device 31 may, for example, initialize the transmission of a video stream from the device 10.

The timeout T1 expires in a step F2. Thus this expiry takes place when the access of the device 31 is to be controlled.

According to the DHCPv4 standard, the device 31 sends a request M5 to renew the lease period associated with the IP address @IP1 that has been allocated to it. This request M5 is a DHCP Request message, and comprises the requested IP address.

The address control module 305 then verifies, as described above in relation to step E1, whether there is a parental control rule to be applied to the device identified in the message M5. The address control module 305 then obtains a data item indicating that access is not authorized, and sends a refusal message M6 to the device 31. This message M6 is a DHCP Nack message. Thus, by sending this message M6, an address allocation refusal is sent by the access device 30 in response to a request M5 from the device 31 received after the start time. Since the device 31 no longer has a valid IP address that would allow it to communicate, it terminates any communication that may be in progress, and cannot establish any new communications. Thus the parental control rule is applied. No modification is required in the devices in the local area network, because the management method is applied to a normal operation of the DHCPv4 protocol. It is emphasized here that, in the DHCPv4 protocol, there is no exchange between a DHCP server and a DHCP client, which allows the DHCP server to withdraw an allocated IP address. Since the lease period is determined on the basis of the parental control start time, an IP address allocated after the control start time may be rendered invalid.

In a step F3, similar to step E1 described above, the device 31 initiates an address allocation procedure by sending, in broadcast mode, a message M7 for the discovery of a DHCP server. A number of implementations are possible following the receipt of this message M7. They result in the absence of a valid address until the end time of the access control rule has passed.

In a first variant embodiment, the access device 30 ignores this discovery message M7. The device 31 then repeats the sending of this message at regular intervals. This first variant has the advantage of limiting the protocol load at the network level.

In a second variant embodiment, in response to this message M7, the access device 30 offers the address @IP1, or a new address @IP2, to the device 31 in a message DHCP Offer and, on receipt of the message DHCP Request requesting the allocation of the address @IP1, sends an allocation refusal DHCP Nack. The device 31 then repeats the sending of the address allocation request at regular intervals.

It is emphasized here that, in the described embodiment, the periods T1 and T2 are determined by the device 31 on receipt of the lease period T. The DHCPv4 standard also allows these periods T1 and T2 to be sent to the device 31 in the messages M2 DHCPv4 Offer and M4 DHCPv4 Ack. In this particular embodiment, the allocation period T1 is, for example, set to be shorter than or equal to the authorized access period.

It is also emphasized that the allocated IP address is selected by the access device 30 from a set of addresses. In a variant embodiment, the access device 30 regularly modifies this set of addresses. This prevents a user of the device from configuring what is called a static address. This is because such a configuration of a static address allows the device 31 to obtain a dynamic IP address without implementing the DHCPv4 standard. When the set of addresses is modified, a static address configured in the former set of addresses is no longer valid, and the device 31 can no longer communicate.

The embodiment describes a functional division between the address control module 305 and the parental control module 304, for the purpose of illustrating exchanges between these modules for the implementation of the management method. It is emphasized here that this functional division is not limiting, and that other implementations are also possible, the aim being for the address control module 305 and the parental control module 304 to interact so that the address associated with the device to be controlled ceases to be valid from the start time of the parental control rule to be applied. By way of illustrative example, the parental control module 304 transmits an identifier of a device to be controlled to the address control module 305. On receipt of the discovery request M1, the address control module 305 interrogates the parental control 304 only if the requesting device 31 is on a list of devices to be controlled.

The description has been provided for the case of a normal lease period configured to be 24 hours. This value is not limiting. It is emphasized here that the normal lease period may be configured to have a value of one hour, for example. This allows the access device 30 to be more reactive in the configuration of a new parental control rule to be applied, or in the modification of an existing rule.

FIG. 2b describes more precisely the exchanges between the access device 30 and a device in the local area network 31 in a second particular embodiment. This second mode is implemented in a local area network of the IPv6 type with stateless autoconfiguration.

The address control module 305 is, notably, arranged to send information relating to the local area network, and implements the ICMPv6 protocol.

Positioning ourselves at the device 31 in the local area network, we shall assume that no IP address is associated with it on initialization.

The access device 30 sends a router discovery message N1 in broadcast mode ("multicast" in English). More precisely, the message N1 is an ICMPv6 Router Advertisement message comprising, notably, a bit M set to the value "0", as described above. The message M1 broadcasts a prefix intended to allow a device in the local area network to construct an address. The message N1 also comprises the following lifetimes:

Valid Lifetime: on the expiry of this timeout, the IPv6 address becomes invalid;

Preferred Lifetime: on the expiry of this timeout, the IPv6 address becomes "deprecated" (as it is called in English).

By way of illustrative example, the lifetime Valid Lifetime is configured to be fifteen minutes, and the lifetime Preferred Lifetime is configured to be five minutes.

In a step H1, the device 31 in the local area network 3 constructs its own IPv6 address @IP1 on the basis of a prefix received.

In a step G1, the address control module 305 obtains a data item indicating that access is not authorized for the device 31 after a start time of the parental control rule. To obtain this data item, in a particular embodiment, the address control module 305 regularly interrogates the parental control module 304. In another particular embodiment, the parental control module 304 notifies the address control module 305 when the start time is reached.

Also in this step G1, at the start time, the address control module 305 sends a router discovery message N2 in broadcast mode to the device 31 identified by its MAC address. More precisely, the message N2 is an ICMPv6 Router Advertisement message comprising, notably, a bit M set to the value "0", as described above, and a zero lifetime. The message N2 broadcasts a prefix and indicates a zero lifetime, this prefix being intended to allow the device 31 to construct an IPv6 address. This message N2 thus relates to the address in the local area network associated with the device 31, and carries an item of information indicating to the device that this address is no longer valid from the time when the message is sent, that is to say the start time of the parental control rule.

This message N2 is ignored by any other devices in the local area network. Only the device 31, which is the recipient of this message N2, processes it. On receipt of this message N2, in a step H2, the device 31 cuts the connections in progress.

It is emphasized here that, according to the mechanisms specified in ICMPv6, the access device 30 periodically sends a router discovery message N1 in broadcast mode. This message N1 is broadcast every 30 to 60 seconds, and is also received by the device 31. To block the access of the device 31, a message N2 is re-transmitted in broadcast mode to the device 31 after each transmission of a message N1. This results in the absence of a valid address until the end time of the access control rule to be applied has passed.

It is emphasized here that the IPv6 address constructed by the device 31 belongs to a set of addresses, identified by the broadcast prefix. In a variant embodiment, similar to that described above in relation to the first embodiment, the access device 30 regularly modifies this set of addresses. This prevents a user of the device from configuring what is called a static address. When the set of addresses is modified, a static address configured in the former set of addresses is no longer valid, and the device 31 can no longer communicate.

FIG. 2c describes more precisely the exchanges between the access device 30 and a device in the local area network 31 in a third particular embodiment. This third mode is implemented in a local area network of the IPv6 type with stateful autoconfiguration.

The address control module 305 is, notably, arranged to allocate addresses in the local area network, and implements the DHCPv6 protocol.

Positioning ourselves at the device 31 in the local area network, we shall assume that no IP address is associated with it on initialization.

The access device 30 sends a router discovery message O1 in broadcast mode ("multicast" in English). More precisely, the message O1 is an ICMPv6 Router Advertisement message comprising, notably, a bit M set to the value "1", as described above.

In a step J1, the device 31 in the local area network 3 initiates an address allocation procedure. More precisely, the device 31 sends, in broadcast mode, a solicit message O2 to detect the presence of a DHCPv6 server on port 547. This solicit message O2 is a DHCPv6 Solicit message, and comprises, among other pieces of information, an identifier of the transmitting device in the form of its MAC address.

This message O2 is received by the address control module 305 of the access device 30 in a step I1.

Also in this step I1, the address control module 305 verifies whether there is a parental control rule to be applied to the device identified in the message O2. We then consider the case in which this verification is positive. Indeed, in the contrary case, the address allocation procedure continues according to the DHCPv6 standard with a normal lifetime LTnorm, set at 24 hours for example.

It should be noted here that, according to the DHCPv6 standard, four "lifetimes" (as they are known in English) are transmitted to a device:

ValidLifeTime: on the expiry of this timeout, the sessions in progress are disconnected;

PreferredLifeTime: on the expiry of this timeout, the IPv6 address becomes "deprecated" (as it is called in English); the device no longer uses the configured IPv6 address for new connections, but maintains the sessions that are in progress.

T1 ("IP Address Renewal Time"), which is the maximum period after which the device will attempt to renew its lease with the access device that allocated an address to it. This timeout T1 is an allocation period associated with the allocated address.

T2 ("IP Address Rebinding Time"), which is the maximum period after which the device will attempt to renew its lease with any server.

If the verification is positive, the address control module 305 obtains a data element indicating whether or not access is authorized. The exchange of messages when access is not authorized is described subsequently with reference to a step J2 executed by the device 31. When access is authorized, the address control module 305 obtains an authorized access period, which is the difference between the start time of the control rule to be applied and the current time (that is to say, the time of receipt of the request). Depending on the implementation, this authorized access period may be determined by the address control module 305 or by the parental control module 304 on the basis of the start time of the parental control rule to be applied.

If the authorized access period is greater than the period T1norm determined for the normal lease period LTnorm, the address allocation procedure continues according to the DHCPv6 standard with the normal lease period LTnorm.

In the contrary case, that is to say if the authorized access period is shorter than the period T1norm, the address control module 305 determines, on the basis of this authorized access period, a lifetime T1 associated with an address @IP1 which will be allocated to the device in the local area network. T1 is usually configured to be 50% of the period PreferredLifeTime, and T2 is configured to be 80% of the period PreferredLifeTime.

The address allocation procedure then continues according to the DHCPv6 standard.

Also in this step I1, the address control module 305 sends on port 546 a message O3 indicating the presence of DHCP servers to the device 31 identified by its MAC address. This message O3 is a DHCPv6 Advertise message, and comprises, notably, the IP address of the access device 30, the IPv6 address @IP1 and the determined lifetimes.

This message O3 is received by the device 31, which sends to the access device 30 a message O4 requesting an address allocation. This message O4 is a DHCPv6 Request message, and is a configuration parameter request message from a client without an address.

The address control module 305 then sends a response message O5 which, notably, allocates the IPv6 address @IP1 to the device 31. This message O5 is a DHCPv6 Reply message, and comprises, notably, the IPv6 address @IP1 and the determined lifetimes. This message O5 relating to an address in the local area network associated with the device 31 thus carries an item of information indicating to the device 31 that this address is no longer valid from the start time of the parental control rule to be applied.

The device 31 initializes the timeouts T1 and T2 on the basis of the received lifetimes. The device 31 then communicates, for example, with the device 10 via the access device 30. The device 31 may, for example, initialize the transmission of a video stream from the device 10.

The timeout T1 expires in a step J2. Thus this expiry takes place when the access of the device 31 is to be controlled.

According to the DHCPv6 standard, the device 31 sends a request O6 to renew the IPv6 address @IP1 that has been allocated to it. This request O6 is a DHCP Renew message and comprises the IPv6 address @IP1.

The address control module 305 then verifies, as described above in relation to step I1, whether there is a parental control rule to be applied to the device identified in the message O7. The address control module 305 then obtains a data item indicating that access is not authorized, and sends a refusal message O7 to the device 31. This message O7 is a DHCP Reply message, with zero lifetimes. Thus, by sending this message O7, an address allocation refusal is sent by the access device 30 in response to a request O6 from the device 31 received after the start time. Since the device 31 no longer has a valid IP address that would allow it to communicate, it terminates any communication that may be in progress, and cannot establish any new communications. Thus the parental control rule is applied. No modification is required in the devices in the local area network, because the management method is applied to a normal operation of the DHCPv6 protocol. It is emphasized here that, in the DHCPv6 protocol, there is no exchange between a DHCP server and a DHCP client, which allows the DHCP server to withdraw an allocated IP address. Since the lifetimes are determined on the basis of the parental control start time, an IPv6 address allocated after the control start time may be rendered invalid.

In a step J3, similar to step J1 described above, the device 31 initiates an address allocation procedure by sending, in broadcast mode, a solicit message O8 to detect the presence of a DHCPv6 server on port 547. This solicit message O8 is a DHCPv6 Solicit message, and comprises, among other pieces of information, an identifier of the transmitting device in the form of its MAC address. A number of implementations are possible following the receipt of this message O8. They result in the absence of a valid address until the end time of the access control rule has passed.

In a first variant embodiment, the access device 30 ignores this solicit message O8 for presence detection. The device 31 then repeats the sending of this message at regular intervals. This first variant has the advantage of limiting the protocol load at the network level.

In a second variant embodiment, in response to this message O8, the access device 30 offers the IPv6 address @IP1, or a new address @IP2, to the device 31, in a DHCPv6 Reply message with zero lifetimes.

It is emphasized here that the allocated IPv6 address is selected by the access device 30 from a set of addresses. In a variant embodiment, similar to that described above in relation to the first embodiment, the access device 30 regularly modifies this set of addresses. This prevents a user of the device from configuring a use of a so-called static address. This is because such a configuration of a static address allows the device 31 to obtain a dynamic IP address without implementing the DHCPv6 standard. When the set of addresses is modified, any static address that may be present is no longer valid, and the device 31 can no longer communicate.

The embodiment describes a functional division between the address control module 305 and the parental control module 304, for the purpose of illustrating exchanges between these modules for the implementation of the management method. It is emphasized here that this functional division is not limiting, and that other implementations are also possible, the aim being for the address control module 305 and the parental control module 304 to interact so that the address associated with the device to be controlled ceases to be valid from the start time of the parental control rule to be applied. By way of illustrative example, the parental control module 304 transmits an identifier of a device to be controlled to the address control module 305. On receipt of the request for discovery of a DHCPv6 server, the address control module 305 interrogates the parental control module 304 only if the requesting device 31 is on a list of devices to be controlled.

The description has been provided for the case of a normal lifetime configured to be 24 hours. This value is not limiting. It is emphasized here that the normal lifetime may be configured to have a value of one hour, for example. This allows the access device 30 to be more reactive in the configuration of a new parental control rule to be applied, or in the modification of an existing rule.

The various embodiments are described below in the context of a parental control application in a home network. It should be noted here that these embodiments are also applicable to the implementation of an access control rule in other types of local area networks, such as business networks.

To summarize, in the various embodiments described, the management method may be used to invalidate an IP address associated with a device on the basis of the start time of the access control rule to be applied, in order to block the access of the device to the local area network. As long as the access control rule is to be applied, the device does not obtain a valid address that would allow it to communicate.

The management technique is executed by means of software and/or hardware components. In this context, the term "module" may equally well refer, in this document, to a software component, a hardware component, or a set of hardware and/or software components, adapted to perform a function or a set of functions as described above for the module in question.

A software component is considered to be one or more computer programs, one or more sub-programs of a program, or more generally any element of a program or a software package. Such a software component is stored in memory and is then loaded and executed by a data processor of a physical entity, and can access the hardware resources of this physical entity (memory devices, recording media, communications buses, input/output circuit cards, user interfaces, etc.).

Similarly, a "hardware component" is considered to be any element of a hardware assembly. It may be a hardware component, whether programmable or non-programmable, with or without an integrated processor for executing software. For example, it may be an integrated circuit, a chip card, a circuit card for executing microsoftware (firmware), etc.

In a particular embodiment, the modules 304, 305 are arranged to execute the management method described above. They are preferably software modules comprising software instructions for the execution of those of the steps of the management method described above that are executed by an access device. The invention therefore also concerns:

a program for an access device, comprising program code instructions intended to command the execution of the steps of the management method described above, when said program is run by this access device;

a recording medium, readable by an access device, on which the program for a device is recorded.

The software modules may be stored in, or transmitted by, a data medium. This medium may be a hardware storage medium, for example a CD-ROM, a magnetic recording medium, for example a magnetic disk, or a hard disk. On the other hand, the data medium may be a transmission medium such as an electrical, optical or radio signal which may be routed via an electrical or optical cable, by radio or by other means. The program code instructions may, in particular, be downloaded from a network such as the Internet.

Alternatively, the data medium may be an integrated circuit in which the program is incorporated, the circuit being adapted to execute the management method described above, or to be used in its execution.

Clearly, the embodiments described above have been provided purely for guidance and in a non-limiting way, and numerous modifications may easily be made by those skilled in the art without departing from the scope of the invention.

The invention claimed is:

1. A method for managing an address in a local area network by an access device allowing access to a wide area communication network, an address allowing a device in the local area network to communicate via the access device with other devices, said method comprising:

obtaining by the access device of an access control rule to be applied, said rule being intended to block communication of data packets by the access device from at least one start time and up to an end time;

sending by the access device to at least one device in the local area network of a message relating to an address in the local area network associated with said device in the local area network, said message carrying an item of information indicating to the device in the local area network that said address is no longer valid from said start time; and said access device executing at least one action leading to an absence of a valid address for said device in the local area network, as long as the end time of the access control rule has not passed.

2. The management method as claimed in claim 1, wherein the message that is sent allocates an address to the device in the local area network for an allocation period which is determined on the basis of the start time.

3. The management method as claimed in claim 2, wherein the action comprises sending an address allocation refusal in response to a request from the device in the local area network received after the start time.

4. The management method as claimed in claim 1, wherein the message is sent from the start time onward, and is a message broadcasting a prefix indicating a zero lifetime, said prefix being intended to allow the device in the local area network to construct said address.

5. The management method as claimed in claim 4, wherein the action comprises re-sending said message.

6. The management method as claimed in claim 1, wherein the action comprises sending a new address in response to a request from the device in the local area network received after the start time, the access control rule being applied by the access device for data packets whose source address corresponds to the new address sent.

7. The management method as claimed in claim 1, comprising a modification by the access device of a set of addresses to which said address belongs.

8. An access device allowing access to a wide area communication network, said access device comprising:
   a processor; and
   a non-transitory computer-readable medium comprising instructions stored thereon, which when executed by the processor configure the access device to perform acts comprising:
   obtaining an access control rule to be applied, said rule being intended to block communication of data packets by the access device from at least one start time onward; and
   sending to at least one device in the local area network a message relating to an address in the local area network associated with said device in the local area network, an address allowing said device in the local area network to communicate via the access device with other devices, said message carrying an item of information indicating to the device in the local area network that said address is no longer valid from said start time, and arranged to execute at least one action leading to an absence of a valid address for said device in the local area network until the end time of the access control rule has passed.

9. The access device as claimed in claim 8, wherein the address control module is also arranged to allocate an address to the device in the local area network for an allocation period which is determined on the basis of the start time.

10. The access device as claimed in claim 8, wherein, the address control module also being arranged to broadcast a prefix, said prefix being intended to allow the device in the local area network to construct said address, the message sent from the start time onward is a message for broadcasting a prefix indicating a zero lifetime.

11. A non-transitory computer-readable medium comprising program code instructions stored thereon to perform a method for managing an address in a local area network by an access device allowing access to a wide area communication network, when said program is executed by a processor of said access device, wherein an address allows a device in the local area network to communicate via the access device with other devices, said method comprising:
   obtaining by the access device of an access control rule to be applied, said rule being intended to block communication of data packets by the access device from at least one start time and up to an end time;
   sending by the access device to at least one device in the local area network of a message relating to an address in the local area network associated with said device in the local area network, said message carrying an item of information indicating to the device in the local area network that said address is no longer valid from said start time;
   said access device executing at least one action leading to an absence of a valid address for said device in the local area network, as long as the end time of the access control rule has not passed.

* * * * *